United States Patent
Kandhalu Raghu et al.

(10) Patent No.: US 11,924,822 B2
(45) Date of Patent: Mar. 5, 2024

(54) CONCURRENT USE OF MULTIPLE PROTOCOLS ON A SINGLE RADIO

(71) Applicant: TEXAS INSTRUMENTS INCORPORATED, Dallas, TX (US)

(72) Inventors: Arvind Kandhalu Raghu, Plano, TX (US); Antony James Cave, Syston (GB); Ramanuja Vedantham, Allen, TX (US); Xiaoxi Bruce Zhang, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/182,530

(22) Filed: Mar. 13, 2023

(65) Prior Publication Data

US 2023/0217427 A1 Jul. 6, 2023

Related U.S. Application Data

(63) Continuation of application No. 17/567,975, filed on Jan. 4, 2022, now Pat. No. 11,632,769, which is a continuation of application No. 16/101,121, filed on Aug. 10, 2018, now Pat. No. 11,219,039.

(60) Provisional application No. 62/544,439, filed on Aug. 11, 2017.

(51) Int. Cl.
*H04B 7/00* (2006.01)
*H04L 47/6275* (2022.01)
(Continued)

(52) U.S. Cl.
CPC ..... *H04W 72/1215* (2013.01); *H04L 47/6275* (2013.01); *H04L 69/18* (2013.01);
(Continued)

(58) Field of Classification Search
None
See application file for complete search history.

(56) References Cited

U.S. PATENT DOCUMENTS

| 7,949,364 B2 | 5/2011 | Kasslin |
| 8,447,235 B2 | 5/2013 | Gao et al. |

(Continued)

FOREIGN PATENT DOCUMENTS

| CN | 102905335 A | 1/2013 |
| WO | 2019033108 A1 | 2/2019 |

OTHER PUBLICATIONS

"UG305: Dynamic Multiprotocol User's Guide", Silicon Labs, Rev. 0.4, pp. 1-23, available at https://www.silabs.com/documents/public/user-guides/ug305-dynamic-multiprotocol-users-guide.pdf, Jul. 18, 2018.

(Continued)

*Primary Examiner* — Gary Lafontant
(74) *Attorney, Agent, or Firm* — Mandy Barsilai Fernandez; Frank D. Cimino

(57) ABSTRACT

A method for concurrent execution of multiple protocols using a single radio of a wireless communication device is provided that includes receiving, in a radio command scheduler, a first radio command from a first protocol stack of a plurality of protocol states executing on the wireless communication device, determining a scheduling policy for the first radio command based on a current state of each protocol stack of the plurality of protocol stacks, and scheduling the first radio command in a radio command queue for the radio based on the scheduling policy, wherein the radio command scheduler uses the radio command queue to schedule radio commands received from the plurality of protocol stacks.

22 Claims, 4 Drawing Sheets

(51) Int. Cl.

| | | |
|---|---|---|
| *H04L 69/18* | (2022.01) | |
| *H04W 28/08* | (2023.01) | |
| *H04W 72/0446* | (2023.01) | |
| *H04W 72/12* | (2023.01) | |
| *H04W 72/1263* | (2023.01) | |
| *H04W 72/566* | (2023.01) | |
| *H04W 4/80* | (2018.01) | |

(52) U.S. Cl.
CPC ... *H04W 28/0925* (2020.05); *H04W 72/0446* (2013.01); *H04W 72/1263* (2013.01); *H04W 72/569* (2023.01); *H04W 4/80* (2018.02)

(56) References Cited

U.S. PATENT DOCUMENTS

| | | |
|---|---|---|
| 2005/0223191 A1 | 10/2005 | Ferris |
| 2007/0238482 A1 | 10/2007 | Rayzman |
| 2008/0291890 A1 | 11/2008 | Yuasa |
| 2009/0157936 A1 | 6/2009 | Goss |
| 2012/0046000 A1* | 2/2012 | Gao ............... H04W 72/02 455/73 |
| 2017/0208623 A1 | 7/2017 | Bate et al. |

OTHER PUBLICATIONS

"CC1352R SimpleLink High-Performance Dual-Band Wireless MCU", SWRS196A, Texas Instruments, Inc., Jan. 2018, revised Jul. 2018, pp. 1-59.

Clive (Max) Maxfield, "Silicon Labs Unveils Multiprotocol Wireless SoCs for theIoT", Embedded, Mar. 14, 2017, pp. 1-3.

Lee Teschler, "The Case for Multiprotocol, Multiband Connectivity in the IoT", Microcontroller Tips, Apr. 21, 2017, pp. 1-5.

C. L. Liu and James W. Layland, "Scheduling Algorithms for Multiprogramming in a Hard-Real-Time Environment", Journal of the ACM (JACM), vol. 20, Issue 1, Jan. 1973, pp. 46-61.

Krysztof Loska, "Unique Thread/Bluetooth Multiprotocol Solution with nRF5 SDK for Thread and nRF52840 SoC by Nordic", Nordic Semiconductor ASA, Jul. 14, 2017, pp. 1-4.

* cited by examiner

CONCURRENT USE OF MULTIPLE PROTOCOLS ON A SINGLE RADIO

CROSS-REFERENCE TO RELATED APPLICATIONS

This application is a continuation of U.S. patent application Ser. No. 17/567,975, filed Jan. 4, 2022, which is a continuation of U.S. patent application Ser. No. 16/101,121, filed Aug. 10, 2018, now U.S. Pat. No. 11,219,039, issued Jan. 4, 2022, which claims the benefit of U.S. Provisional Patent Application No. 62/544,439, filed Aug. 11, 2017, each of which is incorporated by reference herein in its entirety.

BACKGROUND

No single wireless protocol is ideal for every application of wireless sensor networks (WSN). For example, a lighting network can use Zigbee for communication among the light devices in the network while allowing configuration, software updates, and diagnostics via a Bluetooth smart phone or tablet. Or a home automation system can use IEEE 802.15.4-2015 to connect the devices in the system while supporting Bluetooth connectivity between one or more of the devices and a smart phone or tablet for configuration and monitoring.

Thus, there is a need for concurrent execution of more than one protocol on a wireless sensor device. Further, given the constrained power and memory resources in a wireless sensor device, it is important that the concurrent execution of multiple protocols avoids wasting CPU cycles and memory resources.

SUMMARY

Embodiments of the present disclosure relate to methods and apparatus for concurrent use of multiple protocols on a single radio. In one aspect, a method for concurrent execution of multiple protocols using a single radio of a wireless communication device is provided that includes receiving, in a radio command scheduler, a first radio command from a first protocol stack of a plurality of protocol states executing on the wireless communication device, determining a scheduling policy for the first radio command based on a current state of each protocol stack of the plurality of protocol stacks, and scheduling the first radio command in a radio command queue for the radio based on the scheduling policy, wherein the radio command scheduler uses the radio command queue to schedule radio commands received from the plurality of protocol stacks.

In one aspect, a wireless communication device is provided that includes a radio, a radio command scheduler, a memory storing software instructions, wherein execution of the software instructions causes the wireless communication device to concurrently execute multiple protocols using the radio, the software instructions including software instructions to cause the radio command scheduler to receive a first radio command from a first protocol stack of a plurality of protocol stacks executing on the wireless communication device, determine a scheduling policy for the first radio command based on a current state of each protocol stack of the plurality of protocol stacks, and schedule the first radio command in a radio command queue for the radio based on the scheduling policy, wherein the radio command scheduler uses the radio command queue to schedule radio commands received from the plurality of protocol stacks, and a processor coupled to the memory to execute the software instructions.

DETAILED DESCRIPTION

Figure 1:
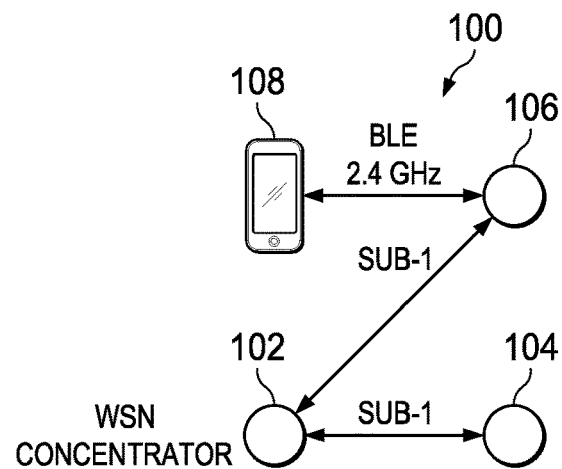
FIG. 1 is a simple example of a wireless sensor network including a node configured to execute multiple protocols concurrently.

Specific embodiments of the disclosure will now be described in detail with reference to the accompanying figures. Like elements in the various figures are denoted by like reference numerals for consistency.

Embodiments of the disclosure provide for concurrent execution of multiple protocols, e.g., Bluetooth Low Energy (BLE), Zigbee, Thread, IEEE 802.15.4-2015, and/or a proprietary protocol, using a shared single radio resource in a wireless communication device, e.g., a wireless sensor device or a gateway device. FIG. 1 is a simple example of a wireless sensor network 100 including a node 106 configured to execute multiple protocols concurrently. The nodes 104, 106 in the network communicate with the WSN concentrator node 102 in the sub-1 gigahertz (GHz) band using a sub-1 GHz protocol such as IEEE 802.15.4-2015 or a proprietary protocol. A sub-1 GHz band can be in the range of the sub-1 GHz industrial, scientific, and medical (ISM) bands which are not the same across the world, e.g., China=433 MHz, United States=916 MHz, and Europe=868 MHz. A node may be, for example, a control device such as a light bulb or a door lock or a sensing device such as a smoke alarm or door sensor in an alarm system or may be both a control device and a sensing device such as a thermostat or a base station in an alarm system. The node 106 also communicates with a smart phone 108 for, e.g., configuration and monitoring, in the 2.4 GHz band using a 2.4 GHz protocol such as Bluetooth Low Energy (BLE).

Figure 2:
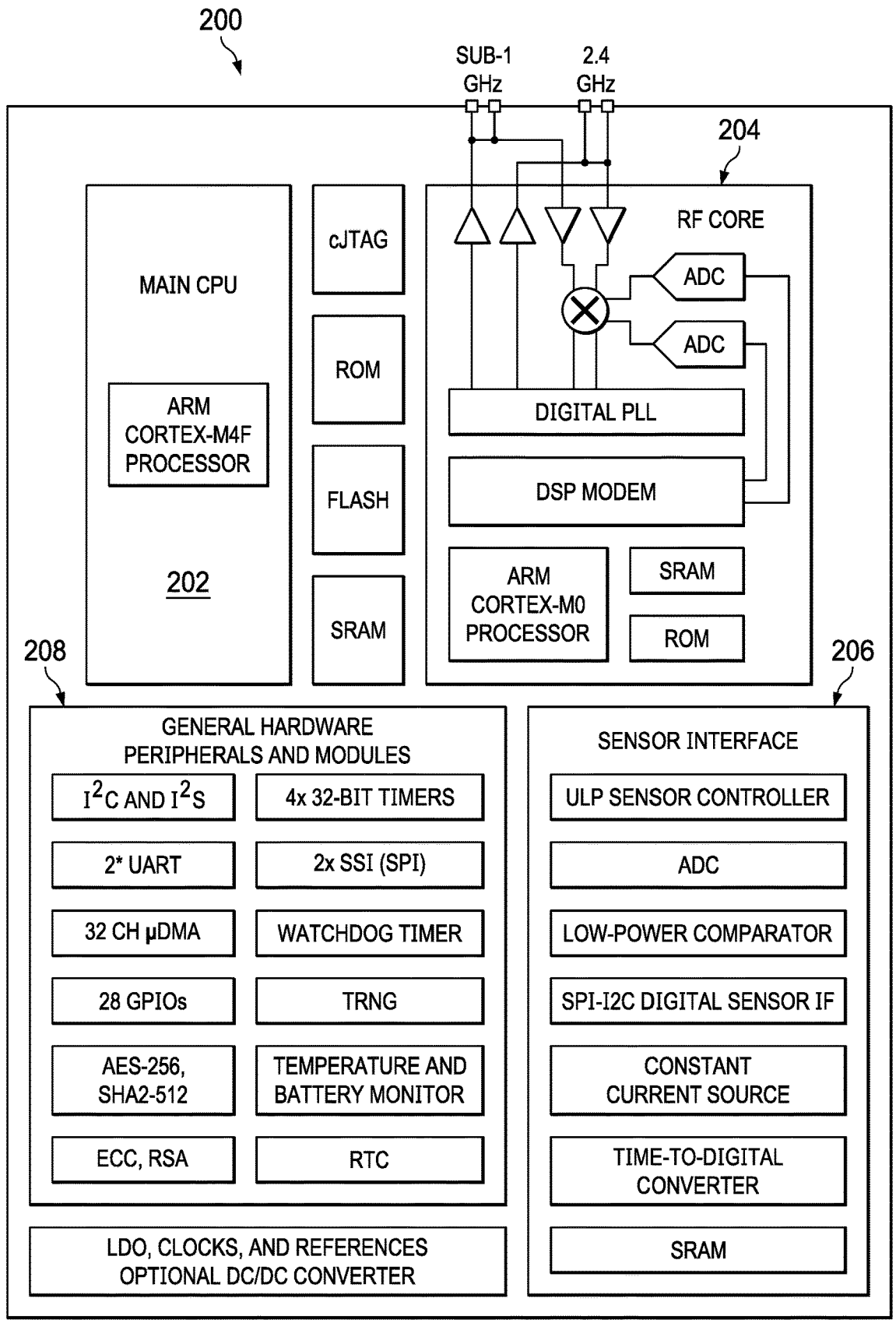
FIG. 2 is a simplified block diagram of an example wireless sensor device configured to execute multiple protocols concurrently.

FIG. 2 is a simplified block diagram of an example wireless sensor device 200, e.g., a wireless communication device, that can be deployed as a node 106 in the example wireless network 100 of FIG. 1. More specifically, the example wireless sensor device 200 is a dual-band wireless microcontroller (MCU) configured to allow concurrent execution of multiple protocols using a single multi-band radio. One example of such a wireless sensor device that can be configured to provide concurrent execution of multiple protocols is the CC1352R dual-band wireless MCU described in "CC1352R SimpleLink™ High-Performance Dual-Band Wireless MCU," SWRS196A, Texas Instruments, Inc., January 2018, revised July 2018, which is incorporated by reference herein.

The MCU 200 incorporates a main CPU 202 for executing applications and protocol software that is implemented as a 32-bit ARM® Cortex®-M4F processor. The protocol software includes protocol stacks for the supported protocols, e.g., Thread, Zigbee, 6LoWPAN, Bluetooth 5, and/or proprietary protocols. General peripherals/modules 208 on the MCU 200 include a 12-bit A/D converter, interfaces for SPI, Microwire, and UART protocols, internal direct memory access (DMA), a real-time clock, multiple 16/32-bit timers, and more. The sensor interface 206 incorporates a programmable sensor controller and peripherals for interfacing with analog or digital sensors.

The MCU 200 also incorporates a radio frequency (RF) core 204 that implements a dual-band sub-1 GHz and 2.4 GHz RF transceiver compatible with multiple protocols including the Bluetooth 5 low energy protocol and the IEEE 802.15.4 protocol. The RF core 204 is designed to autonomously handle time critical aspects of transmitting and receiving various radio protocols. The RF core 204 includes a processor implemented as an ARM® Cortex®-M0 processor for executing software that, e.g., interfaces the analog RF and base-band circuitry, handles data transmission to and from the main CPU 202, and assembles packets for transmission based on the particular protocol corresponding to the packets. The software includes a command-based application program interface (API) used by applications executing on the main CPU 202 to communicate with the RF core 204.

The MCU 200 also incorporates flash memory that provides nonvolatile storage for code and data, static random access memory (SRAM) that can be used for both storage of data and execution of code, and a read-only memory (ROM) storing a real-time operating system kernel. Software instructions implementing methods as described herein can be stored in a computer readable medium on the MCU 200 such as the flash memory, the static random access memory (SRAM), or the read-only memory (ROM) on the MCU 200 and executed by the main processor 202.

A dynamic multi-protocol manager (DMM) executing on the main CPU 202 provides time shared access to the radio for radio commands issued by multiple protocol stacks. The DMM handles dynamic switching of the radio between radio commands issued by the protocol stacks based on scheduling policies and run-time stack states. In general, the DMM receives radio commands from the protocol stacks and inserts the commands into a command queue based on scheduling policies associated with the current states of the stacks and timing information specified in command parameters. The DMM also dispatches commands from the command queue to the radio driver for the radio.

Figure 3:
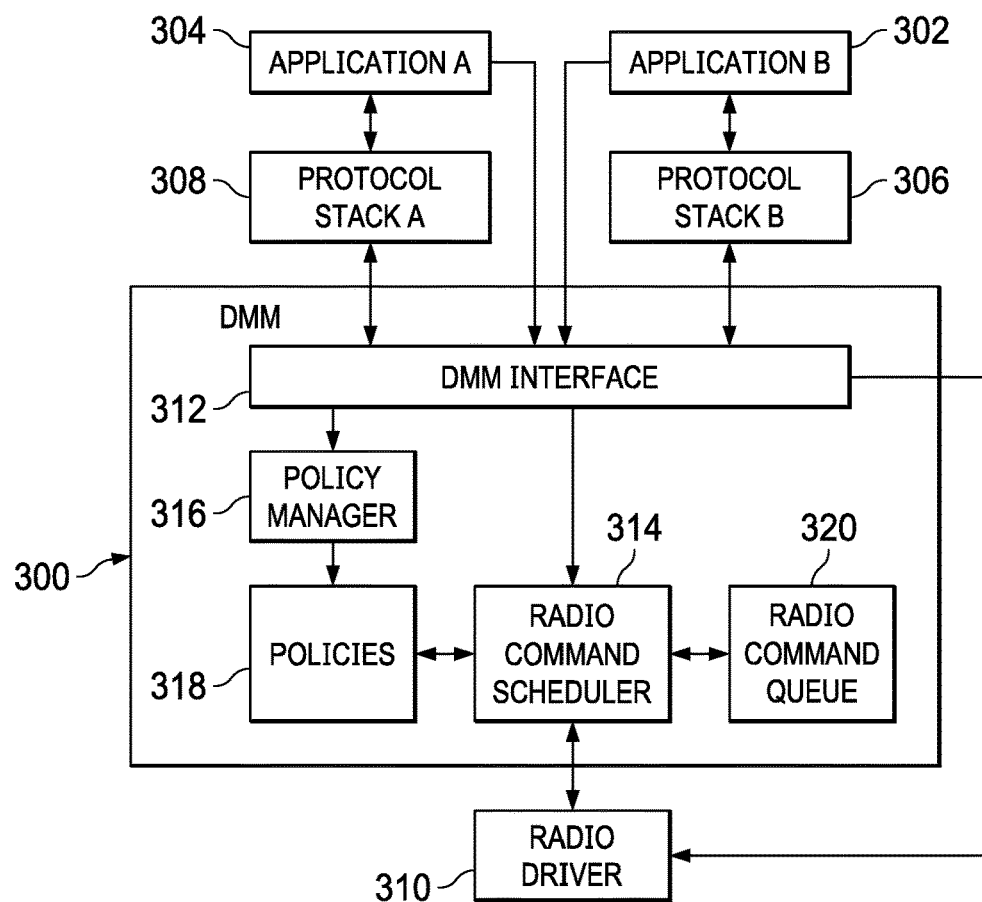
FIG. 3 illustrates the operation of a dynamic multi-protocol manager (DMM)

FIG. 3 shows the interaction of an example embodiment of the DMM 300 logically coupled between two protocol stacks 306, 308 and associated applications 302, 304 and a radio driver 310. The DMM 300 intercepts radio commands from the protocol stacks 306, 308 via the DMM interface 312. In some embodiments, the DMM interface 312 mimes command functions in the command execution application programming interface (API) of the radio driver 310 and uses a function mapping table to map the radio command functions to DMM functions. In some embodiments, some of the intercepted radio commands are passed through to the radio driver 310 with no further processing by the DMM 300. For example, commands that read or write radio setup parameters can be passed through to the radio driver 210 with no further processing by the DMM 300 while commands to send and receive data packets are processed by the DMM 300.

The radio command scheduler 314 manages the radio command queue 320, both adding radio commands to the queue 320 and dispatching radio commands from the queue 320 to the radio driver 310. The radio command scheduler 314 inspects the parameters of each intercepted radio command that needs to be scheduled to determine the start and end times specified for the radio command. The radio command scheduler 314 then attempts to add the radio command to the radio command queue 320 based on the specified start and end times and on a scheduling policy corresponding to the current states of the protocol stacks 306, 308. Each application 302, 304 notifies the radio command scheduler 314 via the DMM interface 312 each time the state of the associated protocol stack 306, 308 changes so that the scheduler 314 knows the current state of each stack when a new radio command needs to be scheduled.

In general, the radio command scheduler 314 scans the radio command queue 320 to attempt to schedule the new radio command in view of the scheduling policies and time parameters of commands in the radio command queue 320 and the time parameters and scheduling policy of the new radio command. The radio command scheduler 314 can, for example, insert the new radio command between radio commands in the radio command queue 320, preempt a currently executing radio command and place the new radio command at the head of the radio command queue 320 to be executed immediately, append the new radio command to the end of the radio command queue 320, or reject the new radio command if the new radio command cannot be added to the queue 320 given the time parameters and the scheduling policy, or, under some circumstances, change the timing of the new radio command so that the new radio command can be added to the radio command queue 320. The scheduling of commands by the radio command scheduler 314 is described in more detail herein in reference to the method of FIG. 4 and the examples of FIGS. 5-7.

A policies data structure 318, e.g., a table or other suitable data structure, stores the scheduling policies used by the scheduler 314. The policy manager 316 initializes the policies data structure 318 when the MCU 200 is powered up from scheduling policy definitions submitted via the DMM interface 312. In some embodiments, the scheduling policies are user-specified. In some embodiments, there are default scheduling policies that can be changed by the user. In some embodiments, a scheduling policy can be changed dynamically by submitting changes to the policy manager 318 via the DMM interface 312.

A scheduling policy corresponding to the current states of the protocol stacks informs the radio command scheduler 314 how any scheduling conflicts for a new radio command are to be resolved. For example, a scheduling policy corresponding to the current protocol stack states can specify the priority of radio commands from each protocol stack 306, 308 and a timing constraint indicating whether or not radio commands from each protocol stack are time critical. If a new radio command is not time critical, the scheduler 314 can potentially modify the time parameters of the new radio command and/or modify the time parameters of an already scheduled radio command that is not time critical in order to schedule the new radio command. The policies data structure 318 includes a scheduling policy for expected combinations of protocol stack states. Further, in some embodiments, multiple stack states of one or both protocol stacks 306, 308 can be mapped to a single scheduling policy.

For example, assume Application A 304 is acting as a BLE peripheral and protocol stack A 308 is a BLE stack and Application B 302 is a sensor application and protocol stack B 306 is for a proprietary protocol. Table 1, Table 2, Table 3, and Table 4 are example scheduling policies for the expected combinations of stack states. Table 4 illustrates a default scheduling policy that is used if the combination of stack states when a radio command is received does not match one of the stack state combinations shown in Tables 1-3.

TABLE 1

| Stack Type | BLE | Proprietary |
|---|---|---|
| Stack State(s) | Advertising | Sleeping, TX, or ACK |
| Policy | Low priority, time critical | High priority, not time critical |

TABLE 2

| Stack Type | BLE | Proprietary |
|---|---|---|
| Stack State(s) | Connecting or connected | TX |
| Policy | High priority, time critical | Low priority, not time critical |

TABLE 3

| Stack Type | BLE | Proprietary |
|---|---|---|
| Stack State(s) | Connecting or connected | ACK |
| Policy | High priority, time critical | Low priority, not time critical |

TABLE 4

| Stack Type | BLE | Proprietary |
|---|---|---|
| Stack State(s) | Any | Any |
| Policy | High priority, time critical | Low priority, not time critical |

Figure 4:
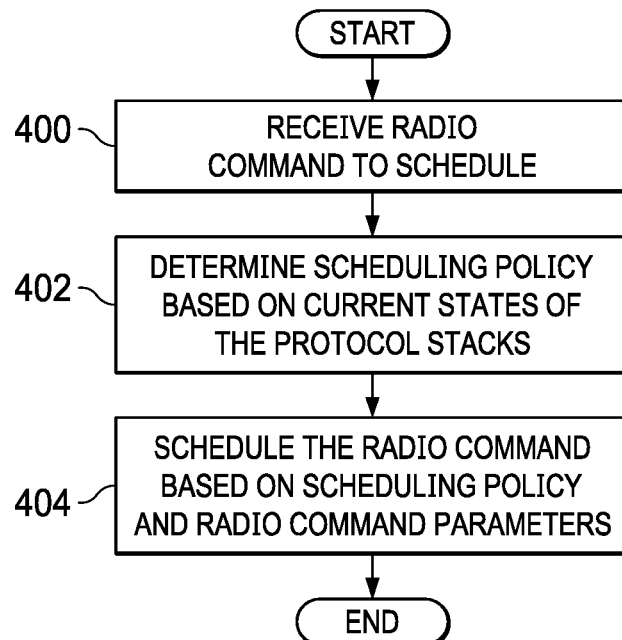
FIG. 4 is a flow diagram of a method for scheduling a radio command in the DMM of FIG. 3.

FIG. 4 is a flow diagram of a method for scheduling a radio command in the DMM 300 of FIG. 3. The method is explained assuming example scheduling policies as previously described herein that specify the priority and timing constraint of a new radio command. Initially, the DMM 300 receives 400 a new radio command to be scheduled from one of the protocol stacks 306, 308. The DMM 300 then determines 402 the scheduling policy to be applied based on the current states of the protocol stacks 306, 308. The current protocol stack states can be used to locate the appropriate scheduling policy in the policies data structure 318. As previously mentioned, the applications 302, 304 notify the DMM 300 each time the state of the respective protocol stacks 306, 308 changes.

The radio command scheduler 314 then schedules 404 the new radio command based on the scheduling policy and the time parameters specified in the radio command. More specifically, the radio command scheduler 314 attempts to schedule the radio command based on one or more of the following criteria: 1) the priority of the radio command as specified in the scheduling policy for the protocol stack that issued the radio command; 2) the timing constraint of the radio command as specified in the scheduling policy for the protocol stack that issued the radio command; 3) the start time of the radio command; and 4) the end time of the radio command.

If the new radio command is a high priority command as per the scheduling policy, the currently executing radio command is a low priority command, and the start and end time parameters of the new radio command overlap the time slot of the low priority command, the scheduler 314 aborts execution of the low priority radio command and places the new radio command at the head of the radio command queue 320 to be immediately executed. The scheduler 314 appends the aborted low priority radio command to the radio command queue 320 if the low priority command is not time critical; otherwise, the radio command scheduler 314 notifies the protocol stack that issued the low priority radio command that the radio command was aborted. If the low priority radio command is pre-empted and appended to the radio command queue 320, the low priority radio command will be executed from the beginning, not resumed at the point where execution was aborted.

If the currently executing radio command is also high priority or the new radio command is low priority, the radio command scheduler 314 attempts to add the new radio command to the radio command queue 320. The radio command scheduler 314 scans the radio commands in the radio command queue 320 looking at the priorities, timing constraints, and time parameters of the queued commands as compared to the same for the new radio command to decide if and where the new radio command can be placed in the radio command queue 320. If the time slot specified by the start time and end time parameters of the new radio command is available between two queued radio commands (as determined by the start and end times of the new radio command and the queued radio commands), the radio command scheduler 314 inserts the new radio command in the radio command queue 320 between the two queued radio commands regardless of the priority of the new radio command and the priorities of the queued radio commands. Note that insertion based on start and end times can result in a low priority command being inserted in the radio command queue 320 before a high priority command. In determining if the specified time slot is available between two queued radio commands, the radio command scheduler 314 can consider modifying the time parameters of queued radio commands that are not time critical to defer execution to free up the specified time slot for the new radio command.

If the radio command scheduler 314 cannot insert the new radio command in the radio command queue 320 at the specified time slot because the time slot is occupied, completely or partially, by a queued radio command, the radio command scheduler 314 then determines whether the new radio command can pre-empt the queued radio command. If the new radio command is low priority, the radio command scheduler 314 cannot pre-empt the queued radio command occupying the specified time slot in favor of the new radio command as a low priority radio command cannot pre-empt either a high priority radio command or another low priority radio command. In this instance, the radio command scheduler 314 appends the new radio command to the end of the radio command queue 320 if the scheduling policy indicates that the new radio command is not time critical; otherwise, the new radio command cannot be scheduled and the radio command scheduler 314 rejects the new radio command.

If the new radio command is high priority and the queued radio command occupying the specified time slot is also high priority, the radio command scheduler 314 cannot pre-empt the queued radio command in the specified time slot in favor of the new radio command as a high priority radio command cannot pre-empt another high priority radio command. In this instance, the radio command scheduler 314 appends the new radio command to the end of the radio command queue 320 if the scheduling policy indicates that the new radio command is not time critical; otherwise, the new radio command cannot be scheduled and the radio command scheduler 314 rejects the new radio command.

If the new radio command is high priority and the queued radio command occupying the specified time slot is low priority, the radio command scheduler 314 pre-empts the queued low priority radio command to free up the specified time slot for the new radio command in the radio command queue 320 and inserts the new radio command in the radio command queue 314. The radio command scheduler 314 appends the pre-empted low priority radio command to the end of the radio command queue 320 if the pre-empted radio command is not time critical; otherwise, the radio command scheduler 314 aborts the pre-empted radio command and notifies the protocol stack that issued the low priority radio command that the radio command has been pre-empted. In each of the above instances in which the radio command scheduler 314 appends a radio command to the radio command queue 320, the radio command scheduler 314 modifies the time parameters of the appended radio command as needed to accommodate the start time and end time deferral.

Figure 5:
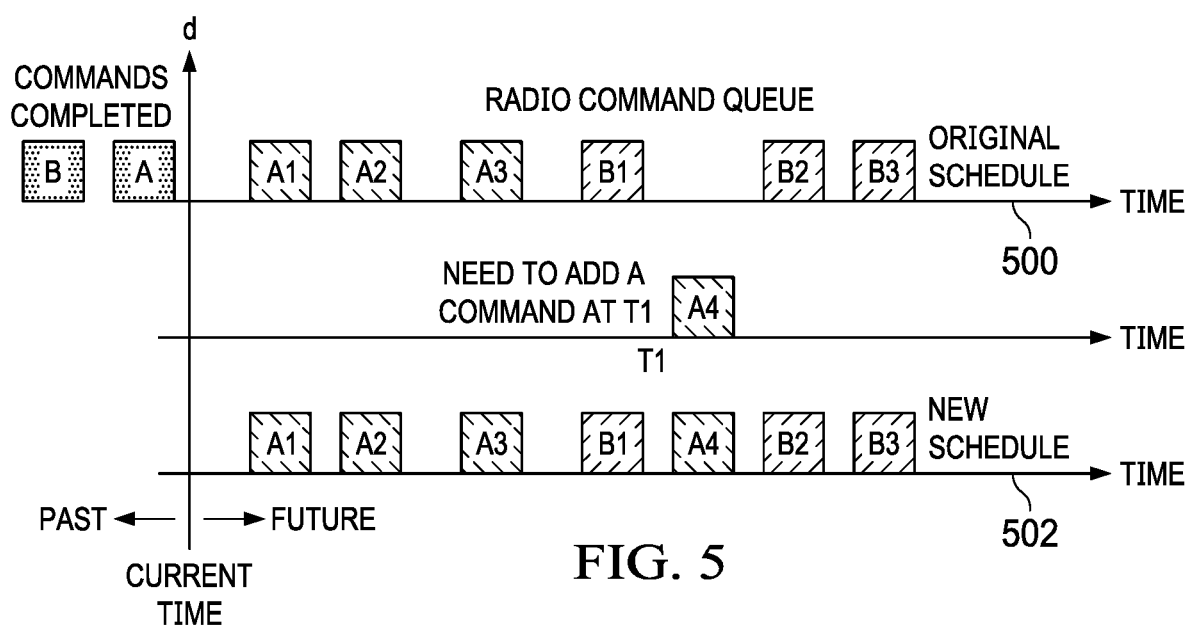
FIGS. 5, 6, and 7 are examples illustrating scheduling of radio commands.
Figure 6:
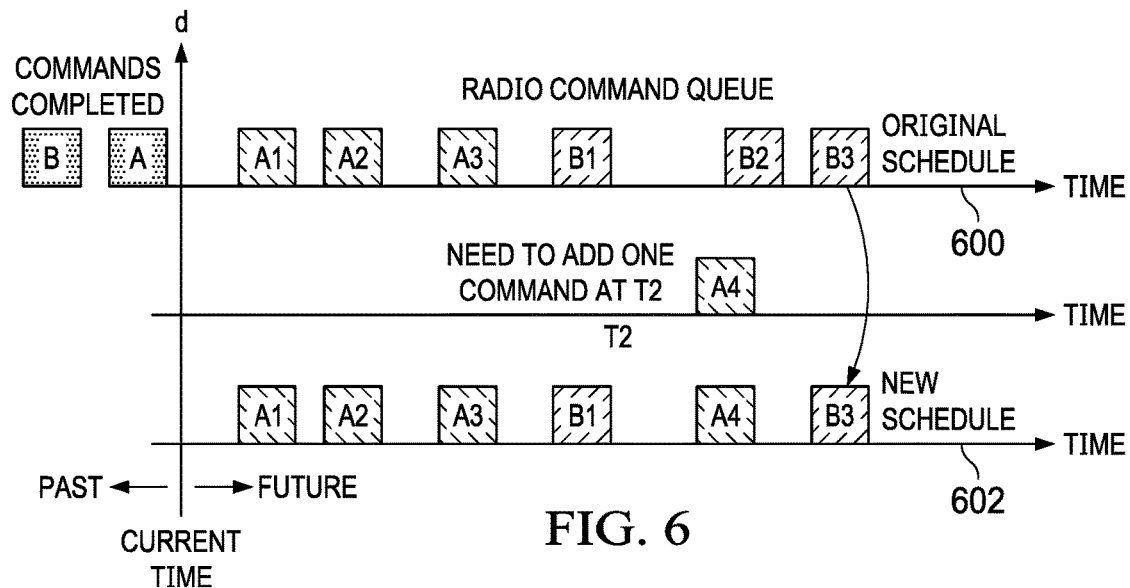
Figure 7:
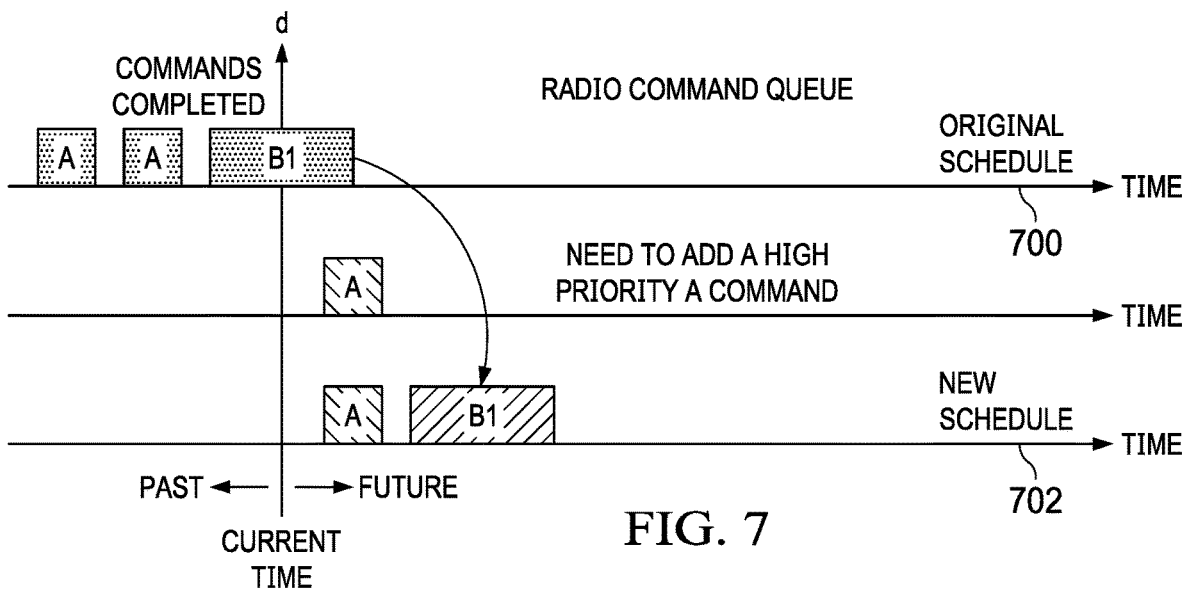

FIGS. 5, 6, and 7 are examples illustrating scheduling of radio commands. FIG. 5 is an example of inserting a radio command in an available time slot in the radio command queue 320. The original schedule 500 includes three radio commands A1, A2, and A3 from protocol stack A 308 and three radio commands B1, B2, and B3 from protocol stack B 306. At time T1, the radio command scheduler 314 receives a new radio command A4 from protocol stack A 308. The radio command scheduler 314 attempts to add A4 to the radio command queue 320 by scanning the radio command queue 320 for the time slot specified by the start time and end time parameters of A4. The radio command scheduler 314 locates the time slot between B1 and B2 as the specified end time of B1 is before the specified start time of A4 and the specified start time of B2 is after the specified end time of A4. The radio command scheduler 314 inserts A4 in the time slot between B1 and B2 even if A4 is a high priority command and B1 is a low priority command. In the new schedule 502, the radio command A4 is slotted between the radio commands B1 and B2.

FIG. 6 is an example of preempting a queued low priority radio command in favor of a high priority radio command. The original schedule 600 includes three high priority radio commands A1, A2, and A3 from protocol stack A 308 and three low priority radio commands B1, B2, and B3 from protocol stack B 306. At time T2, the radio command scheduler 314 receives a new radio command A4 from the protocol stack A 308 that is high priority as per the scheduling policy for the current states of the protocol stack. The radio command scheduler 314 attempts to add A4 to the radio command queue 320 by scanning the queue for the time slot specified by the start time and end time parameters of A4. The radio command scheduler 314 determines that the specified time slot for A4 is between B1 and B3 and is at least partially occupied by B2, which is low priority. The radio command scheduler 314 pre-empts B2 in favor of A4, removes B2 from the queue 320, and places A4 between B1 and B3 in the queue 320. The radio command scheduler 314 also determines that B2 cannot be rescheduled because B2 is time critical and notifies the protocol stack B 306 that the radio command B2 has been pre-empted. In the new schedule 602, radio command A4 is slotted between radio command B1 and radio command B3, replacing radio command B2.

FIG. 7 is an example of preempting and restarting a low priority radio command that is currently executing when a high priority radio command is received. The original schedule 700 is empty and the low priority non-time critical radio command B1 is currently being executed by the radio driver 310. The radio command scheduler 314 receives the radio command A from the protocol stack A 308 and determines from the scheduling policy that radio commands received from the protocol stack A 308 currently have high priority. The radio command scheduler 314 also determines from the time parameters of A that the time slot needed for A overlaps that B1. The radio command scheduler 314 causes the radio driver 310 to abort execution of the low priority radio command B1 and places the new radio command A at the head of the radio command queue 320. Because B1 is not time critical, the radio command scheduler 314 reschedules B1 by appending B1 to the radio command queue 320, as shown in the new schedule 702. Note that B1 will be executed from the beginning, not resumed at the point the command execution was aborted.

OTHER EMBODIMENTS

While the disclosure has been described with respect to a limited number of embodiments, those having benefit of this disclosure will appreciate that other embodiments can be devised which do not depart from the scope of the disclosure as disclosed herein.

Embodiments have been described herein assuming a dual-band radio. In some embodiments, the radio is single band and all protocols stacks share the same band. In some embodiments, the radio has more than two bands.

Embodiments have been described herein in reference to example scheduling policies that specify the priority and timing constraint of a new radio command. In some embodiments, scheduling policies can include more and/or different information that the scheduler considers when scheduling new radio commands.

For simplicity of explanation, embodiments have been described herein assuming concurrent execution of two protocols using a single radio resource. Other embodiments provide concurrent execution of more than two protocols using a single radio resource. For example, protocol stacks for ZigBee (2.4 GHz), Thread (2.4 GHz) and BLE (2.4 GHz) or protocol stacks for a proprietary protocol (sub-1 GHz), Thread (2.4 GHz) and BLE (2.4 GHz) can be concurrently executed. An example application that can benefit from concurrent execution of more than two protocols is a home automation gateway that controls devices that communicate using different protocols, e.g., a BLE door bell, ZigBee lights, and a Thread thermostat.

It is therefore contemplated that the appended claims will cover any such modifications of the embodiments as fall within the true scope of the disclosure.

What is claimed is:
1. A method comprising:
receiving, from a first protocol stack of a plurality of protocol stacks of a first device, a first command directed to a shared radio;
determining a first timing constraint that indicates whether the first command can be rescheduled;
scheduling the first command in a command queue for the shared radio in a first time slot;
after scheduling the first command in the command queue, receiving, from a second protocol stack of the plurality of protocol stacks, a second command directed to the shared radio;
scheduling the second command in the command queue in a second time slot that at least partially overlaps with the first time slot;
when the first timing constraint indicates that the first command can be rescheduled, rescheduling the first command to a different time slot in the command queue;

when the first timing constraint indicates that the first command cannot be rescheduled, notifying the first protocol stack that the first command has been preempted without rescheduling the first command in the command queue; and executing commands in the command queue in the shared radio.

2. The method of claim 1, wherein receiving the second command comprises receiving the second command during execution of the first command in the shared radio, the method further comprising aborting execution of the first command in the shared radio.

3. The method of claim 2, wherein, executing commands in the command queue comprises, when the first timing constraint indicates that the first command can be rescheduled, executing a rescheduled first command in the shared radio from the beginning.

4. The method of claim 2, further comprising notifying the first protocol stack that the execution of the first command has been aborted.

5. The method of claim 1, wherein rescheduling the first command to the different time slot in the command queue comprises rescheduling the first command to a head of the command queue.

6. The method of claim 1, wherein rescheduling the first command to the different time slot in the command queue comprises appending the first command to the end of the command queue.

7. The method of claim 1, further comprising determining the different time slot in the command queue based on a priority of the first command.

8. The method of claim 1, wherein executing commands in the shared radio comprises executing commands of one of the first and second protocol stacks in a first frequency band, and executing commands of another of the first and second protocol stacks in a second frequency band that is different from the first frequency band.

9. The method of claim 8, wherein the first frequency band is a 2.4 GHz frequency band and the second frequency band is a sub-1 GHz frequency band.

10. The method of claim 1, wherein executing commands in the shared radio comprises executing commands of one of the first and second protocol stacks in a first frequency band, and executing commands of another of the first and second protocol stacks in the first frequency band.

11. The method of claim 10, wherein the first frequency band is a 2.4 GHz frequency band or a sub-1 GHz frequency band.

12. The method of claim 10, wherein the command queue further comprises commands from a third protocol stack of the plurality of protocol stacks.

13. The method of claim 12, wherein executing commands in the shared radio comprises executing commands of the third protocol stack in a second frequency band that is different from the first frequency band.

14. The method of claim 1, wherein the shared radio is a multi-band radio.

15. The method of claim 1, wherein the plurality of protocol stacks comprises more than two different protocol stacks.

16. The method of claim 1, wherein the plurality of protocol stacks comprises protocol stacks from one or more of ZigBee, Thread, BLE, and a sub-1 GHz protocol stack.

17. The method of claim 1, wherein the first device is a home automation gateway.

18. The method of claim 1, wherein the first device concurrently communicates, using the shared radio, with a second device using Bluetooth Low Energy (BLE), with a third device using ZigBee, and with a fourth device using Thread.

19. The method of claim 1, wherein one of the first and second protocol stacks is an IEEE 802.15.4 stack, and the other of the first and second protocol stacks is not an IEEE 802.15.4 stack.

20. A device comprising:
a shared radio;
at least one processor; and
a non-transitory computer readable memory coupled to the at least one processor and storing instructions, that when executed, cause the at least one processor to:
communicate with a first protocol stack;
communicate with a second protocol stack that is different from the first protocol stack;
receive a first command from the first protocol stack directed to the shared radio;
determine a first timing constraint that indicates whether the first command can be rescheduled;
schedule the first command in a command queue for the shared radio in a first time slot;
after scheduling the first command in the command queue, receive, from the second protocol stack, a second command directed to the shared radio;
schedule the second command in the command queue in a second time slot that at least partially overlaps with the first time slot;
when the first timing constraint indicates that the first command can be rescheduled, reschedule the first command to a different time slot in the command queue;
when the first timing constraint indicates that the first command cannot be rescheduled, notify the first protocol stack that the first command has been preempted without rescheduling the first command in the command queue; and
dispatch commands in the command queue to the shared radio.

21. A system comprising:
a first device comprising:
a shared radio;
at least one processor; and
a non-transitory computer readable memory coupled to the at least one processor and storing instructions, that when executed, cause the at least one processor to:
communicate with a first protocol stack;
communicate with a second protocol stack that is different from the first protocol stack;
receive a first command from the first protocol stack directed to the shared radio;
determine a first timing constraint that indicates whether the first command can be rescheduled;
schedule the first command in a command queue for the shared radio in a first time slot;
after scheduling the first command in the command queue, receive, from the second protocol stack, a second command directed to the shared radio;
schedule the second command in the command queue in a second time slot that at least partially overlaps with the first time slot;
when the first timing constraint indicates that the first command can be rescheduled, reschedule the first command to a different time slot in the command queue;

when the first timing constraint indicates that the first command cannot be rescheduled, notify the first protocol stack that the first command has been preempted without rescheduling the first command in the command queue; and dispatch commands in the command queue to the shared radio.

22. The system of claim 21, further comprising a second and third device, wherein the first protocol stack is configured to communicate with the second device using a first protocol, and the second protocol stack is configured to communicate with the third device using a second protocol different from the first protocol.

* * * * *